United States Patent
Moriguchi et al.

[11] Patent Number: 6,164,088
[45] Date of Patent: *Dec. 26, 2000

[54] METHOD FOR RECOVERING CONDENSABLE GAS FROM MIXED GAS AND CONDENSABLE GAS RECOVERING APPARATUS

[75] Inventors: Tetsuo Moriguchi; Suenobu Hamano, both of Tokyo, Japan

[73] Assignee: Mitsubishi Denki Kaishushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/208,012

[22] Filed: Dec. 9, 1998

[30] Foreign Application Priority Data

Jul. 27, 1998 [JP] Japan .................................. 10-211013

[51] Int. Cl.[7] ...................................................... P25J 3/00
[52] U.S. Cl. ................................. 62/636; 62/908; 62/927
[58] Field of Search ............................. 62/636, 626, 908, 62/927

[56] References Cited

U.S. PATENT DOCUMENTS

| | | | |
|---|---|---|---|
| 3,866,428 | 2/1975 | Simonet et al. ........................... | 62/908 |
| 4,283,212 | 8/1981 | Graham et al. ........................... | 62/636 |
| 4,425,142 | 1/1984 | Mann ...................................... | 55/25 |
| 5,601,634 | 2/1997 | Jain et al. ................................ | 95/114 |
| 5,720,797 | 2/1998 | Yates . | |

FOREIGN PATENT DOCUMENTS

| | | |
|---|---|---|
| 0 350 677 | 1/1990 | European Pat. Off. . |
| 0 458 171 A1 | 11/1991 | European Pat. Off. . |
| 1-61922 | 4/1989 | Japan . |
| 1-69619 | 5/1989 | Japan . |
| 1-128815 | 9/1989 | Japan . |
| 7-112522 | 12/1995 | Japan . |
| 8-240382 | 9/1996 | Japan . |
| WO 96/23574 | 8/1996 | WIPO . |

*Primary Examiner*—William Doerrler
*Attorney, Agent, or Firm*—Sughrue, Mion, Zinn, Macpeak & Seas, PLLC

[57] ABSTRACT

A method for recovering a condensable gas from a mixed gas uses a condensable gas recovering apparatus. The apparatus comprises a compressor for compressing a mixed gas comprising a condensable gas and an incondensable gas, a mixed gas separator including a cooler and an adsorbent that adsorbs the incondensable gas, and a vacuum exhauster. The method comprises the steps of introducing the mixed gas highly compressed by the compressor into the mixed gas separator, liquefying and recovering the condensable gas by cooling the mixed gas separator with the cooler while the adsorbent adsorbs the incondensable gas contained in the mixed gas in a high pressure state, and exhausting the incondensable gas from the adsorbent in a low pressure state where the gas in the mixed gas separator has been exhausted by the vacuum exhauster. Therefore, recovery of the condensable gas is carried out with high reliability, and mixing of a large quantity of the condensable gas into the incondensable gas is easily prevented.

13 Claims, 10 Drawing Sheets

Fig.6 vapor pressure of $SF_6$

METHOD FOR RECOVERING CONDENSABLE GAS FROM MIXED GAS AND CONDENSABLE GAS RECOVERING APPARATUS

FIELD OF THE INVENTION

The present invention relates to a method for recovering a condensable gas from a mixed gas comprising the condensable gas and an incondensable gas, and an apparatus used for the method. More specifically, the invention relates to a method for separating a mixed gas comprising nitrogen gas, which is an electrical insulating gas used for electrical equipment, and sulfur hexafluoride ($SF_6$) gas into the nitrogen gas (incondensable gas) and the $SF_6$ gas (condensable gas), and recovering the condensable gas. The invention also relates to a condensable gas recover apparatus used for the recovery.

BACKGROUND OF THE INVENTION

A condensable gas, such as $SF_6$ gas, is confined as an insulating gas in a gas insulator such as a gas insulation switching apparatus installed in a power plant, and it is necessary to open the gas insulator when the power plant is inspected. To recover the condensable gas such as $SF_6$ gas confined in the apparatus without discharging it into the air at the time of inspection has been demanded in view of economics or prevention of global warming.

Figure 13:
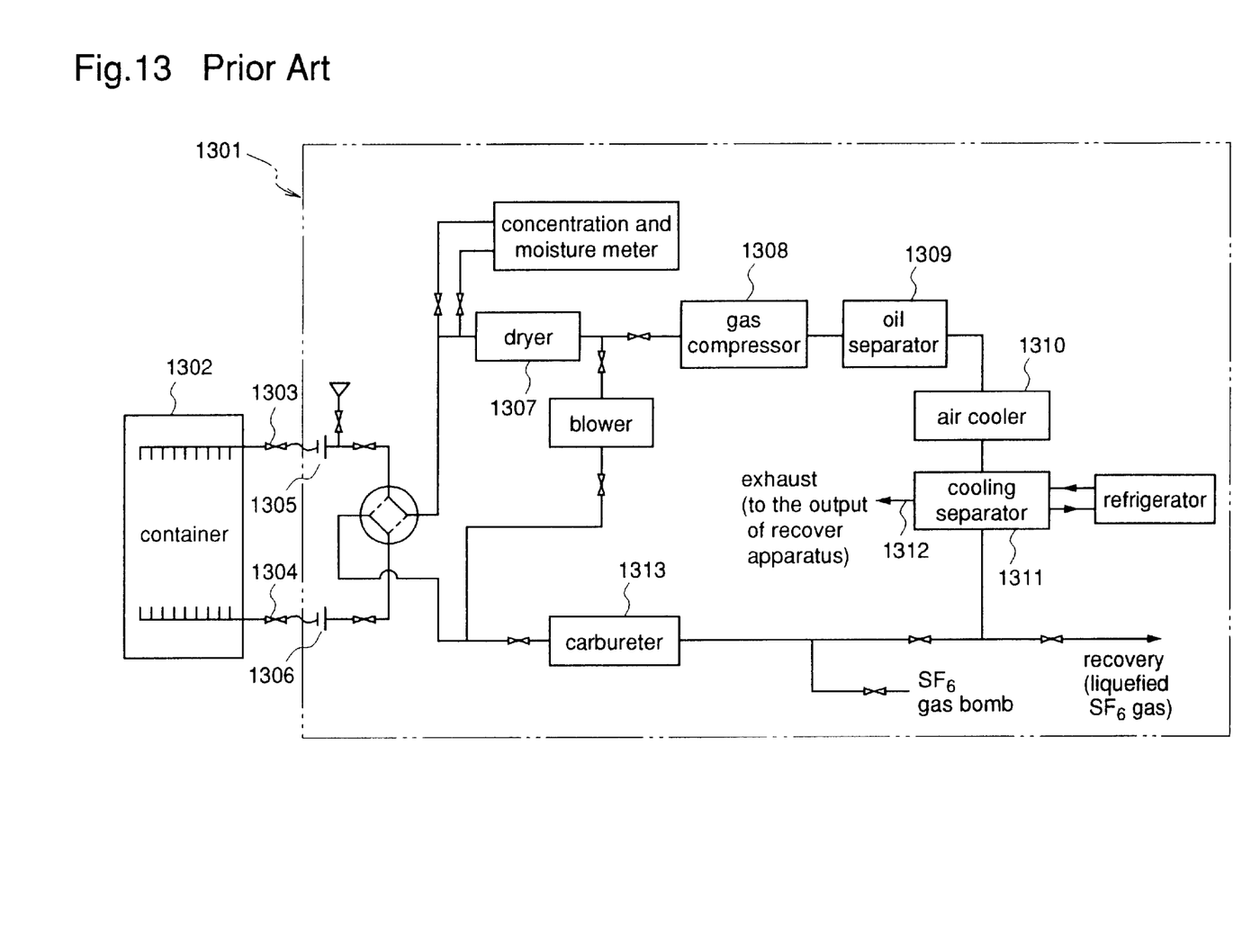
FIG. 13 is a block diagram illustrating the whole structure of a gas replacing and recovering apparatus according to the prior art.

In order to meet this demand, Japanese Published and Examined Patent Application No. Hei. 5-78718 proposed a gas replacing and recovering apparatus for recovering a condensable gas used as an insulating gas, such as $SF_6$. FIG. 13 is a system diagram showing the gas replacing and recovering apparatus. In the figure, reference numeral 1301 designates an insulating gas liquefying, replacing and recovering apparatus comprising a carburetor 1313, a dryer 1307, a gas compressor 1308, an oil separator 1309, an air cooler 1310, an exhaust pipe, and end connections 1305 and 1306. The end connections 1305 and 1306 are members for connecting the insulating gas liquefying, replacing and recovering apparatus 1301 with a container 1302 described later through an upper port 1303 and a lower port 1304, respectively.

The container 1302 is, for example, an outer container for a gas insulation switching apparatus employed in a power plant.

The insulating gas liquefying, replacing and recovering apparatus 1301 is used for recovering the condensable gas in the container without discharging it to the air when the condensable gas is introduced into the container or when the container is opened. Hereinafter, a description is given of a method for replacing air in the container 1302 with a desired amount of $SF_6$ gas and recovering an excess of $SF_6$ using the insulating gas liquefying, replacing and recovering apparatus 1301.

Initially, liquefied $SF_6$ is introduced from an $SF_6$ bomb (not shown) into the insulating gas liquefying, replacing and recovering apparatus 1301, and the liquefied $SF_6$ is vaporized and decompressed by the carburetor 1313. Then, the vaporized $SF_6$, namely, $SF_6$ gas is introduced through the end connection 1306 and the lower port 1304 into the container 1302.

When the $SF_6$ gas is introduced into the container 1302, it mixes with air which is an incondensable gas and has already been existing in the container, and a mixed gas so produced is introduced through the upper port 1303 and the end connection 1305 into the insulating gas liquefying, replacing and recovering apparatus 1301.

The mixed gas introduced into the apparatus 1301 is completely dried by the dryer 1307 and, thereafter, it is processed through the gas compressor 1308, the oil separator 1309 and the air cooler 1310, to reach the cooling separator 1311.

When the mixed gas is cooled in the cooling separator 1311, the $SF_6$ gas liquefies before the air. So, the liquefied $SF_6$ is collected, and the mixed gas comprising the residual air and the unliquefied $SF_6$ gas is discharged through the exhaust pipe 1312 to the air. The liquefied $SF_6$ is again vaporized and sent to the container 1302. This work is repeated until the container 1302 is filled with a desired amount of $SF_6$ gas. In the case of simply collecting the $SF_6$ gas, the liquefied $SF_6$ is collected.

The insulating gas liquefying, replacing and recovering apparatus 1301 performs liquefaction and replacement of the insulating gas as described above and is able to recover the insulating gas according to the application. In the apparatus 1301, however, when a mixed gas comprising an incondensable gas such as air and a condensable gas such as $SF_6$ gas is cooled, the condensable gas equivalent to the vapor pressure remains as it is in the incondensable gas under the cooling temperature. When this incondensable gas is discharged to the air as exhaust gas, the condensable gas is also discharged to the air, resulting in economical and environmental problems.

If an insulating gas to be processed comprises a pure condensable gas alone, since only a very small amount of the condensable gas exists in the incondensable gas when discharging the incondensable gas to the air according to the above-mentioned process, the absolute quantity of the condensable gas discharged to the air is very small and this does not lead to a serious problem. However, as in the case where an insulating gas to be processed is a mixed gas from the beginning, when processing a mixed gas in which the percentage of an incondensable gas is larger than the percentage of a condensable gas, the quantity of the condensable gas discharged to the air increases and, therefore, this problem is not negligible.

With a view to recovering a condensable gas without discharging it to the air, Japanese Published Patent Application No. Hei. 9-285719 proposed an $SF_6$ gas recovery and reproduction apparatus and a movable recovery and reproduction apparatus, wherein a very small amount of incondensable gas, which is generated inside a gas insulator or mixed during the process of gas replacement, is completely adsorbed into an adsorbent to realize recovery of a condensable gas containing no incondensable gas.

Figure 14:
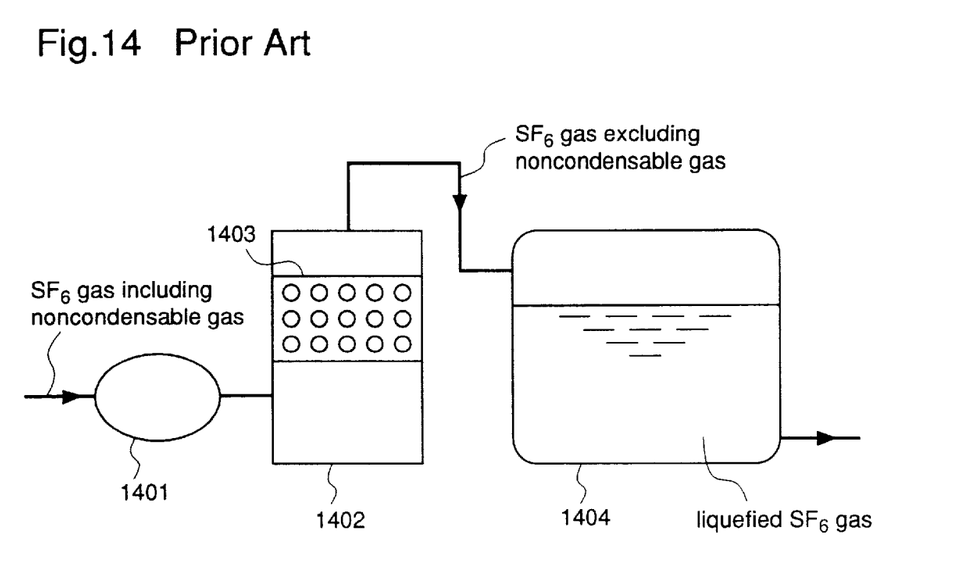
FIG. 14 is a schematic diagram illustrating a gas recovering apparatus according to the prior art.

The technique disclosed in this prior art will be described with reference to FIG. 14. As shown in FIG. 14, $SF_6$ gas including a very small amount of incondensable gas is compressed by a compressor 1401 and then introduced through a first air adsorber 1402 into a liquefier 1404. The first air adsorber 1402 contains a synthetic zeolite 1403, and the incondensable gas included in the $SF_6$ gas, such as nitrogen gas and oxygen gas, is adsorbed into the synthetic zeolite 1403, where by the incondensable gas is removed and pure $SF_6$ is recovered.

However, the above-described technique has the following drawback. Although this technique is effective when the absolute quantity of the incondensable gas is very small, it cannot be applied to a mixed gas in which the percentage of an incondensable gas is apparently larger than that of $SF_6$ gas.

SUMMARY OF THE INVENTION

The present invention is made to solve the above-described problems and has for its object to provide a method for recovering a condensable gas from a mixed gas comprising the condensable gas and an incondensable gas, for example, a method for recovering $SF_6$ gas from a mixed gas comprising $SF_6$ gas and nitrogen gas used as an electrical insulating gas.

It is another object of the present invention to provide a condensable gas recovering apparatus employed for the above-described method.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a method for recovering a condensable gas from a mixed gas by using a condensable gas recovering apparatus which comprises a compressor for compressing a mixed gas comprising a condensable gas and an incondensable gas, a mixed gas separator including an adsorbent that adsorbs the incondensable gas and a cooler, and a vacuum exhauster. The method comprises a first step of introducing the mixed gas highly compressed by the compressor into the mixed gas separator, a second step of liquefying and recovering the condensable gas by cooling the mixed gas separator with the cooler while the adsorbent adsorbs the incondensable gas contained in the mixed gas in a high pressure state, and a third step of exhausting the incondensable gas from the adsorbent in a low pressure state where the gas in the mixed gas separator has been exhausted by the vacuum exhauster. Therefore, recovery of the condensable gas is carried out with high reliability, and mixing of a large quantity of the condensable gas into the incondensable gas is easily prevented.

According to a second aspect of the present invention, there is provided a method for recovering a condensable gas from a mixed gas by using a condensable gas recovering apparatus which comprises a compressor for compressing a mixed gas comprising a condensable gas and an incondensable gas, a mixed gas separator including an adsorbent that adsorbs the incondensable gas, a cooler and a heater, and a vacuum exhauster. The method comprises a first step of introducing the mixed gas highly compressed by the compressor into the mixed gas separator, a second step of liquefying and recovering the condensable gas by cooling the mixed gas separator with the cooler while the adsorbent adsorbs the incondensable gas contained in the mixed gas in a high pressure state, and a third step of exhausting the incondensable gas from the adsorbent by heating the adsorbent with the heater in a low pressure state where the gas in the mixed gas separator has been exhausted by the vacuum exhauster. Therefore, the incondensable gas can be easily exhausted from the adsorbent that has adsorbed the incondensable gas and saturated, whereby the efficiency in the recovery work is improved.

According to a third aspect of the present invention, in the above-described condensable gas recovering method, the condensable gas recovering apparatus has a couple of mixed gas separators, and one of the mixed gas separators performs the second step while the other mixed gas separator performs the third step. Therefore, the recovery work can be carried on by continually driving the condensable gas recovering apparatus, whereby the efficiency in the recovery work is improved.

According to a fourth aspect of the present invention, in the above-described condensable gas recovering method, the cooler is embedded in the adsorbent. Or, the adsorbent is disposed in an upper part of the mixed gas separator, and the cooler is disposed inside the adsorbent as well as under the adsorbent in the mixed gas separator. Or, the adsorbent is disposed in an upper part of the mixed gas separator, and the cooler is disposed under the adsorbent in the mixed gas separator. In any case, since the adsorbent is cooled by the cooler, the temperature in the mixed gas separator is made uniform, and the motive power for generating natural circulation of the mixed gas in the mixed gas separator is always secured, resulting in improved efficiency in the recovery work.

According to a fifth aspect of the present invention, there is provided a condensable gas recovering apparatus comprising a compressor for compressing a mixed gas comprising a condensable gas and an incondensable gas, a mixed gas separator including an adsorbent that adsorbs the incondensable gas and a cooler, and a vacuum exhauster. Therefore, a condensable gas can be liquefied and recovered with high reliability by using the condensable gas recovering apparatus.

DETAILED DESCRIPTION OF THE PREFERRED EMBODIMENTS

Hereinafter, embodiments of the present invention will be described with reference to the drawings. However, the embodiments described below are merely examples, and the present invention is not restricted to these embodiments. Further, in the following description, "a condensable gas" means a gas which is condensed and liquefied when its pressure is set to about 30 atm in the temperature range of a general-purpose refrigerator, i.e., from 30° C. to −30° C. For example, $SF_6$ gas, freon gas, and hydrocarbon gas such as propane gas are condensable gases. On the other hand, "an incondensable gas" means a gas which is not condensed under the above-described condition, such as nitrogen gas and air. Although in the following description $SF_6$ gas and nitrogen gas are employed as a condensable gas and an incondensable gas, respectively, the present invention is not restricted to these gases and a mixture of these gases.

[Embodiment 1]

A first embodiment of the present invention relates to a method for recovering a condensable gas from a mixed gas comprising the condensable gas and an incondensable gas (hereinafter referred to simply as a mixed gas), using a condensable gas recovering apparatus provided with a compressor, a mixed gas separator containing an adsorbent and a cooler, and a vacuum exhauster. Before describing the recovery method, the condensable gas recovering apparatus used for this method will be described with reference to FIGS. 1~5.

Figure 1:
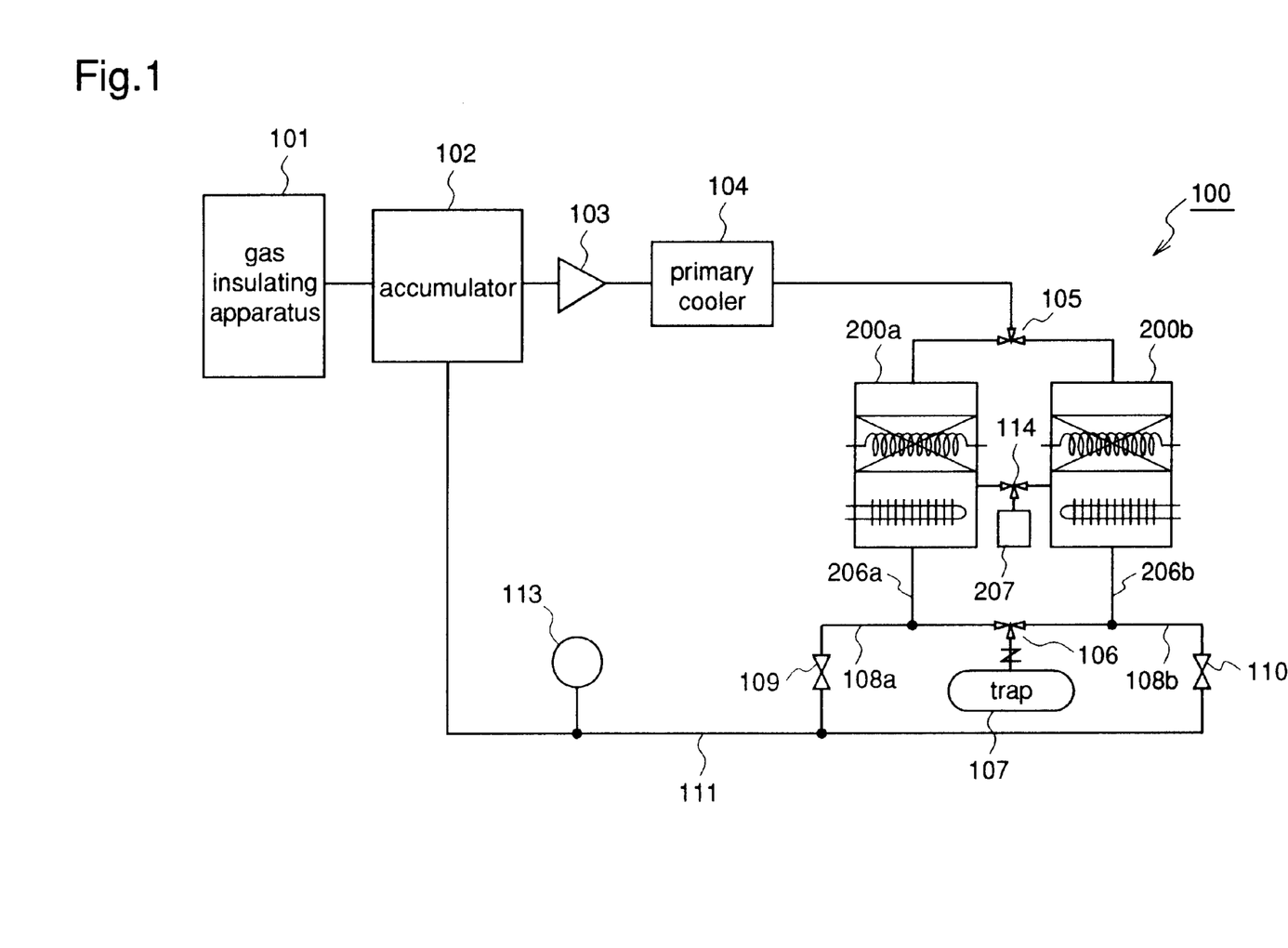
FIG. 1 is a block diagram illustrating the whole structure of a condensable gas recovering apparatus.
Figure 2:
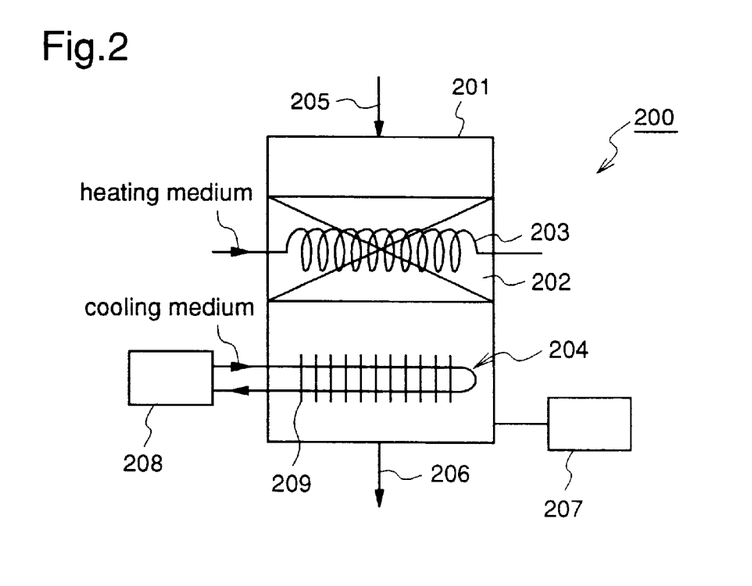
FIG. 2 is a block diagram schematically illustrating a mixed gas separator according to a first embodiment of the invention.
Figure 3:
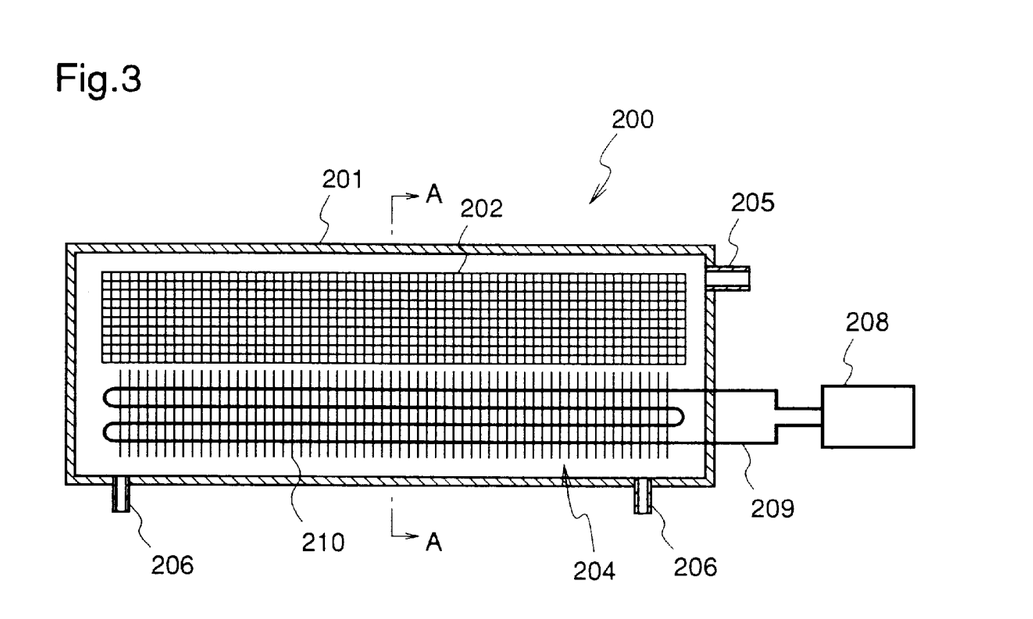
FIG. 3 is a cross-sectional view of the mixed gas separator in the major-axis direction.

FIG. 1 is a block diagram illustrating the whole structure of a condensable gas recovering apparatus 100 used for the method of recovering a condensable gas from a mixed gas according to the first embodiment of the invention. FIG. 2 is a block diagram illustrating the schematic structure of a mixed gas separator 200 as a constituent of the condensable gas recovering apparatus 100. FIG. 3 is a cross-sectional view of the mixed gas separator 200 in the major-axis direction, and FIG. 4 is a cross-sectional view taken along a line A—A in FIG. 3.

The condensable gas recovering apparatus 100 shown in FIG. 1 comprises a gas insulator 101, an accumulator 102, a gas compressor 103, a primary cooler 104, a pair of mixed gas separators 200a and 200b, switching valves 105, 106 and 114, valves 109 and 110, a trap 107, branch pipes 108a and 108b, pipes 111, 206a and 206b, and a gas concentration meter 113.

The mixed gas separator 200 shown in FIG. 2 is identical to the mixed gas separators 200a and 200b shown in FIG. 1. The mixed gas separator 200 comprises a pressure tank 201, an adsorption layer 202, a coil 203, a gas cooler 204, and pipes 205 and 206. Reference numeral 207 designates a vacuum exhauster, and numeral 208 designates a refrigerator. Although the structure of the mixed gas separator 200 can be simplified by omitting the coil 203, it is desirable that the mixed gas separator 200 is provided with the coil 203 for the reason described later.

Figure 4:
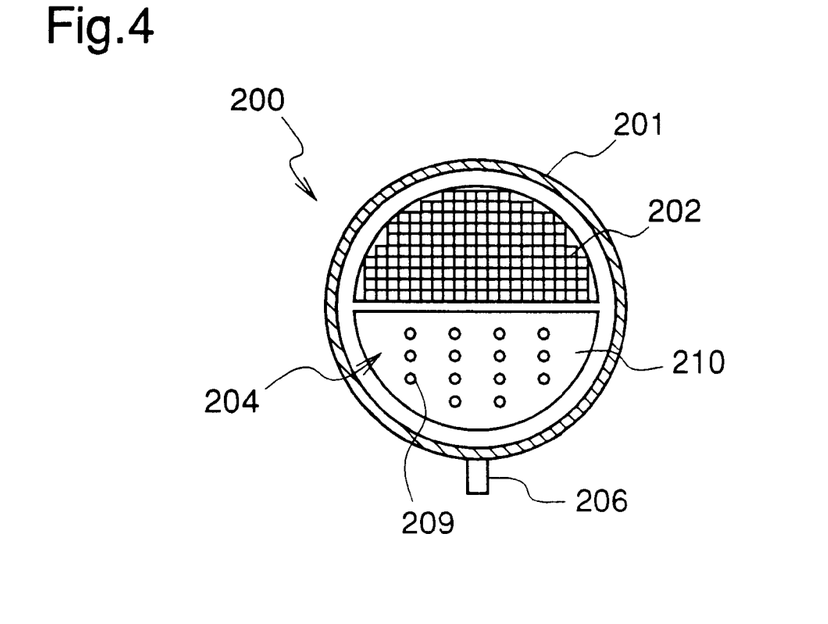
FIG. 4 is a cross-sectional view taken along a line A—A in FIG. 3.

The mixed gas separator 200 is cylindrical in shape, both ends of which are closed, as shown in FIGS. 3 and 4. The shape of the mixed gas separator 200 is not restricted thereto, but it is desirable that the mixed gas separator 200 has such a shape in order to facilitate liquefaction and recovery of a condensable gas and to bear up against a high pressure of a mixed gas introduced therein.

A description is given of the structure of the condensable gas recovering apparatus 100 with reference to the figures.

The gas insulator 101 is an apparatus used in an electric plant, like a gas insulation switching apparatus. In the gas insulator 101, an electrical equipment (not shown) according to the purpose is disposed. The gas insulator 101 is filled with a mixed gas, and the electrical equipment is driven while being kept in the electrically insulated state by the mixed gas.

The gas insulator 101 is connected through the accumulator 102 to the gas compressor 103. The outlet port of the gas compressor 103 is connected to the primary cooler 104, and the outlet port of the primary cooler 104 is connected through the switching valve 105 to the mixed gas separators 200a and 200b.

The pipes 206a and 206b are drawn from the bottoms of the mixed gas separators 200a and 200b, respectively, and these pipes are joined at the switching valve 106 and connected to the trap 107. The pipes 108a and 108b branch off from the pipes 206a and 206b, respectively, and the branch pipes 108a and 108b are connected to the valves 109 and 110, respectively.

The valves 109 and 110 are connected through the pipe 111 to the accumulator 102 which is disposed at the inlet port of the gas compressor 103.

Figure 5:
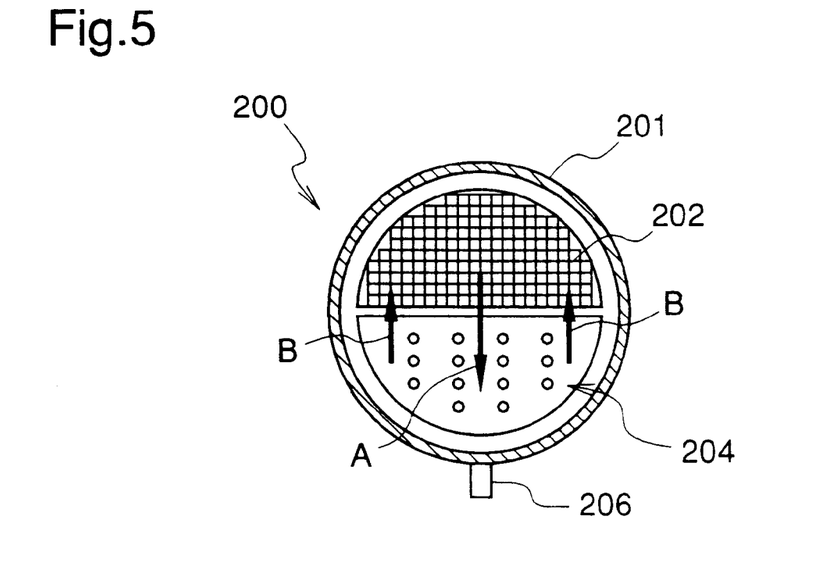
FIG. 5 is a diagram illustrating the flow of a condensable gas and an incondensable gas in the mixed gas separator.

With reference to FIGS. 4 and 5, in the cross-sectional view of the mixed gas separator 200, the adsorption layer 202 is disposed fanwise in the upper part of the pressure tank 201, and the gas cooler 204 is disposed fanwise beneath the adsorption layer 202. The gas cooler 204 comprises a plurality of fan-shaped heat-transfer fins 210 thermally connected with a heat-transfer pipe 209 through which a cooling medium flows, thereby increasing the heat-exchange area. Although these heat-transfer fins 210 are not always necessary, it is desirable that the apparatus is provided with these fins 210 to increase the cooling efficiency.

The adsorption layer 202 is filled with an adsorbent that selectively adsorbs nitrogen gas, such as zeolite described in "Journal of Japan Society of mechanical Engineers, 1998 January, Vol. 101, No. 950, p. 37". To be specific, aluminosilicate expressed by the following chemical formula is employed as the adsorbent.

$$xM_{(2/n)}O \cdot Al_2O_3 \cdot ySiO_2 \cdot zH_2O$$

(M: alkali metal or alkaline-earth metal)

Particularly, it is desirable that M is Ca (calcium) in the chemical formula because, in this case, zeolite having high selective adsorptivity of nitrogen gas is obtained.

Although an adsorbent that selectively adsorbs nitrogen gas is employed in this first embodiment, it is a matter of course that an adsorbent suitable for an incondensable gas as a component of a mixed gas is employed.

While in this first embodiment the condensable gas recovering apparatus 100 has a pair of mixed gas separators 200, the number of the mixed gas separators is not restricted thereto. That is, the apparatus 100 may have a single mixed gas separator 200, or three or more mixed gas separators 200.

Next, a description is given of a method for recovering $SF_6$ gas from the mixed gas by using the condensable gas recovering apparatus 100 constructed as described above. This recovering method comprises the following three steps: a first step of introducing a highly compressed mixed gas into the mixed gas separator 200 (200a or 200b); a second step of liquefying and recovering $SF_6$ gas by cooling the mixed gas separator 200 with the cooler 204 while nitrogen gas in the mixed gas is adsorbed into the adsorbent in the high pressure state; and a third step of exhausting the nitrogen gas from the adsorbent in the low pressure state where the gas within the mixed gas separator 200 is exhausted using the vacuum exhauster.

Hereinafter, the method for recovering $SF_6$ gas from the mixed gas using the condensable gas recovering apparatus 100 will be described in more detail.

In the first step, initially, the mixed gas confined in the gas insulator 101 is subjected to suction and compression by the gas compressor 103 through the accumulator 102, resulting in a high-pressure gas. The high-pressure mixed gas is sent to the primary cooler 104 and cooled therein. The cooled high-pressure gas is introduced into one of the mixed gas separators 200a and 200b by controlling the switching valve 105. It is assumed that the cooled high-pressure gas is introduced into the mixed gas separator 200a.

The above-described first step is followed by the second step described below.

The nitrogen gas in the high-pressure mixed gas introduced into the mixed gas separator 200a is selectively adsorbed into the adsorption layer 202. At this time, in the mixed gas separator 200a, the concentration of the $SF_6$ gas in the mixed gas increases because the nitrogen gas is adsorbed into the adsorption layer 202 and thereby removed from the mixed gas.

Since the high-concentration $SF_6$ gas has a specific gravity larger than that of the nitrogen gas, the $SF_6$ gas starts to precipitate toward the bottom of the pressure tank 201 due to its dead weight as shown by arrow A in FIG. 5. During the process, the high-concentration $SF_6$ gas passes through the gas cooler 204 disposed beneath the adsorption layer 202.

A device such as a refrigerator 208 is connected with the gas cooler 204 as shown in FIG. 3, and the passing $SF_6$ gas is cooled by a cooling medium supplied from the refrigerator 208. So, the $SF_6$ gas is cooled when it touches the gas cooler 204, and liquefied as its latent heat is taken away. The liquefied $SF_6$ is deposited at the bottom of the pressure tank 201. Then, the liquefied $SF_6$ flows into the pipe 206a at the bottom of the pressure tank 201 and is stored in the trap 107 through the switching valve 106.

Figure 6:
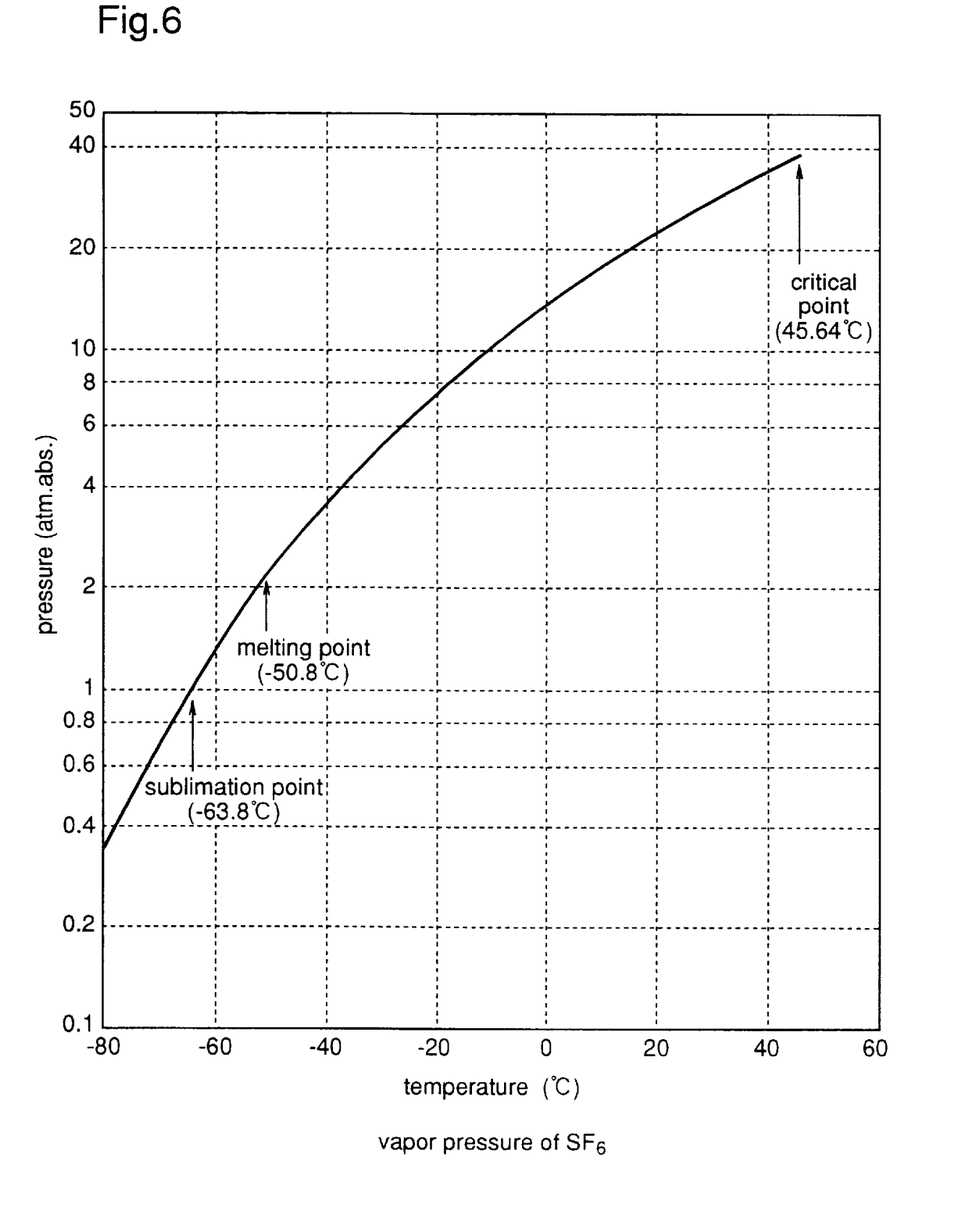
FIG. 6 is a graph relating to a saturated vapor pressure curve of $SF_6$.

The phenomenon that the high-temperature and high-pressure $SF_6$ gas is cooled and liquefied will be described briefly with reference to a graph shown in FIG. 6 relating to the saturated vapor pressure of $SF_6$. For example, when $SF_6$ gas having a temperature of 30° C. and a pressure of 30 atm.abs. is cooled while maintaining the pressure, the saturated vapor pressure of the $SF_6$ gas is lowered as shown in FIG. 6. However, since the high pressure is maintained, a required amount of the $SF_6$ gas is liquefied so that the vapor pressure of the $SF_6$ gas becomes the saturated vapor pressure.

Since the specific gravity of the nitrogen gas remaining in the mixed gas in this stage is small, the nitrogen gas spontaneously moves, due to the buoyant force, toward the adsorption layer 202 in the pressure tank 201 as shown by arrows B in FIG. 5, and it is adsorbed into the adsorbent. Therefore, natural circulation of the gas occurs between the adsorption layer 202 and the gas cooler 204.

The mixed gas so processed is exhausted from the pressure tank 201 through the pipe 206a. The exhaust gas is returned to the accumulator 102 through the pipe 108a, the valve 109 and the pipe 111. The exhaust returned to the accumulator 102 is again used in the first step. The concentration of the $SF_6$ gas in the exhaust gas is monitored by the gas concentration meter 113 disposed on the route to the accumulator 102. When the concentration of the $SF_6$ gas in the exhaust gas becomes sufficiently low, the valve 109 is closed and the pressure in the mixed gas separator 200a is reduced by the vacuum exhauster 207, whereby the nitrogen gas escapes from the adsorption layer 202.

In this first embodiment of the invention, in order to shorten the gas circulation route for efficient and high-speed gas circulation, the mixed gas separator 200 has a cylindrical shape, both ends of which are closed, and the adsorption layer 202 is disposed fanwise in an upper portion of the mixed gas separator 200 in the transverse cross-sectional view while the gas cooler 204 is disposed beneath the adsorption layer 202. Since the mixed gas separator 200 has such a shape, it can stand the high pressure of the mixed gas introduced therein.

Although the mixed gas separator 200 is disposed with its major-axis direction being horizontal, it may be inclined by some degrees in the major-axis direction to facilitate exhaustion of the liquefied condensable gas from the pipe 206.

The purpose in thermally connecting the heat transfer pipe 209, through which a cooling medium flows, with the fan-shaped heat-transfer fins 210 to provide a large heat-exchange area in the gas cooler 204 is to prevent the heat-transfer efficiency of part of the gas cooler 204 in contact with the mixed gas from being lowered due to the gas circulation like the natural convection.

The second step is carried out as described above. In this recovery method, usually the first step and the second step are alternatingly repeated by circulating the exhaust gas, whereby the $SF_6$ gas is liquefied and recovered and then the mixed gas from which the $SF_6$ gas has been removed is exhausted.

However, in the repetition of the second step, the nitrogen gas adsorbing power of the adsorption layer 202 will be saturated in due time. The third step is executed when the nitrogen gas adsorbing power of the adsorption layer 202 is saturated.

In the third step, the nitrogen gas adsorbing power of the adsorption layer 202 is recovered. To be specific, after hermetically sealing the mixed gas separator 200a by controlling the switching valves 105 and 106 and the valve 109, the mixed gas separator 200a is evacuated using the vacuum exhauster 207 to make a low-pressure state. Thereby, the nitrogen gas escapes from the adsorption layer 202 and is discharged from the mixed gas separator 200a.

Figure 7:
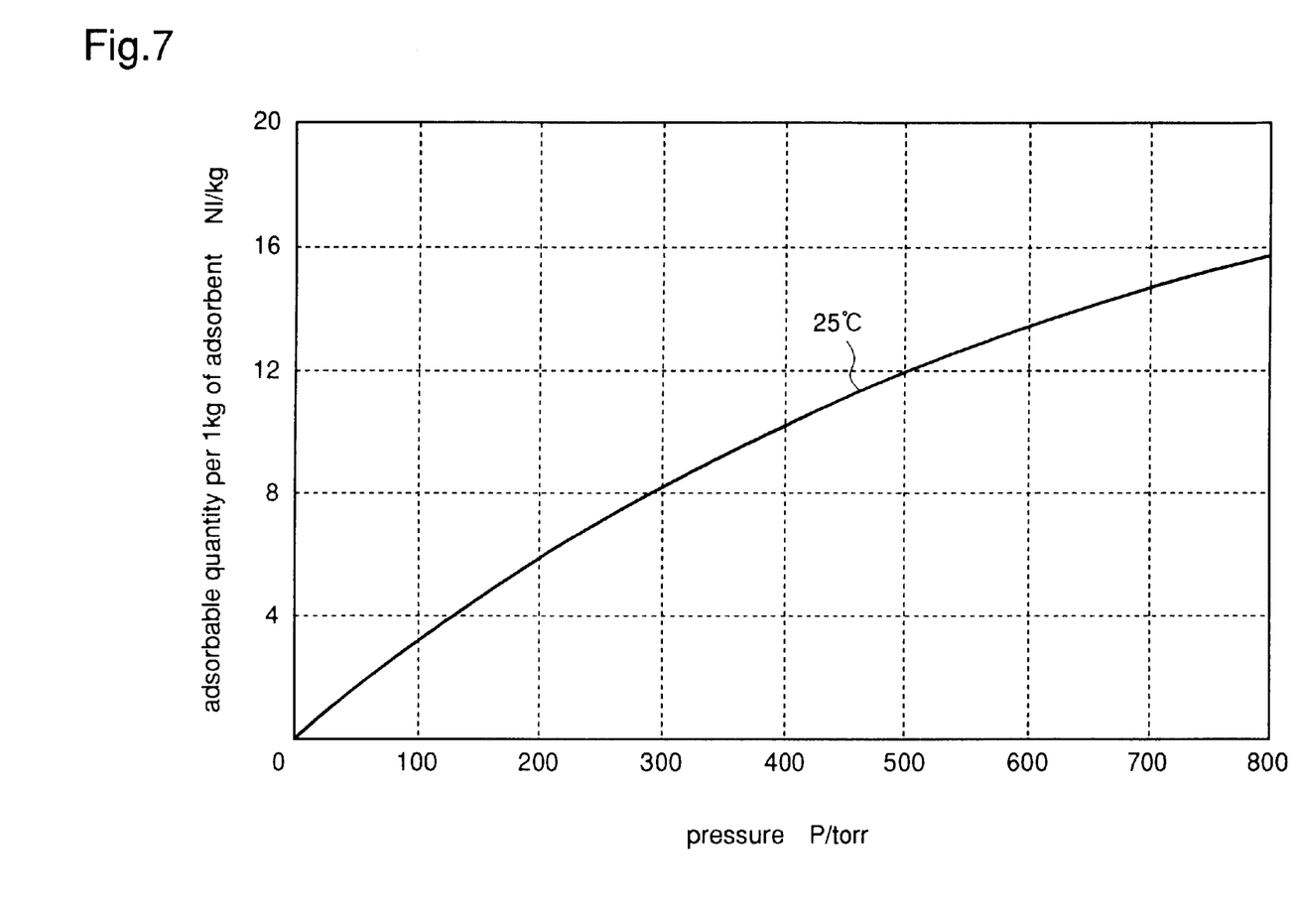
FIG. 7 is a graph showing the relationship between the adsorbable quantity of nitrogen gas by an adsorbent and the pressure.

This phenomenon will be briefly described with reference to FIG. 7. The adsorbable quantity of nitrogen gas by the adsorbent depends on the pressure. For example, when the pressure is 500 P/torr, the adsorbable quantity of nitrogen gas per 1 kg of the adsorbent is 12 N1/kg (normal liter per kilogram). When the pressure is lowered to 100 P/torr, the adsorbable quantity of nitrogen was decreases to about 3 N1/kg. That is, the nitrogen gas exceeding he adsorbable quantity spontaneously escapes from the adsorbent by simply lowering the pressure. When the pressure is increased to the initial value after the deaeration, the adsorbable quantity increases, whereby the adsorbing power of the adsorbent is recovered.

By recovering the adsorption layer 202 as described above, the mixed gas separator 200a can be used again for the second step.

The escape of the nitrogen gas from the adsorbent can be promoted by supplying a heating medium from the coil 203 which is thermally connected with the adsorption layer 202. For this reason, it is desirable that the mixed gas separator 200a is provided with the coil 203.

Figure 8:
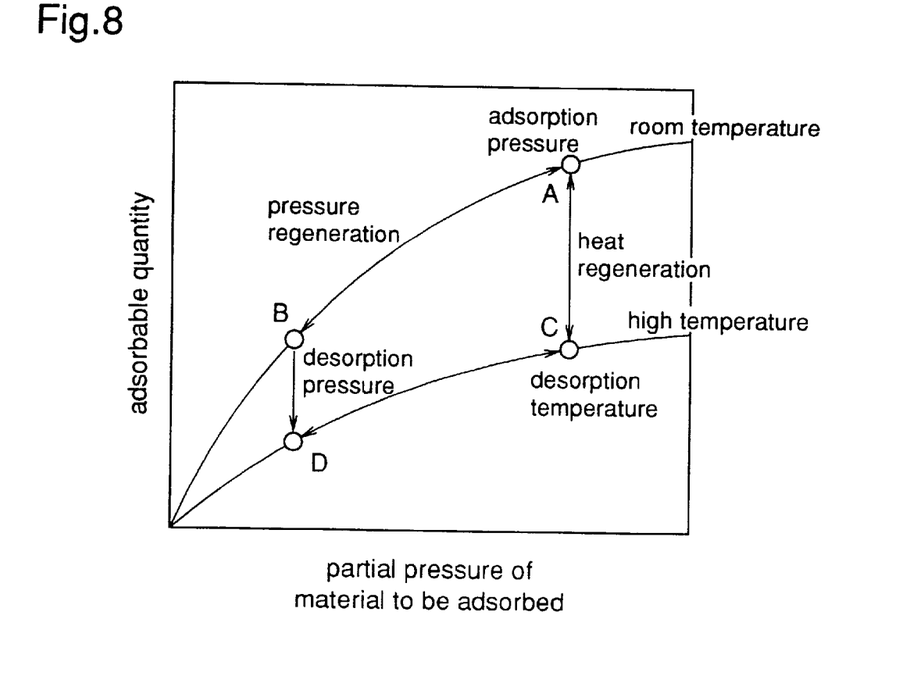
FIG. 8 is a graph relating to the comparison between heating reproduction and pressure reproduction.

This phenomenon will be described with reference to the graph shown in FIG. 8. It is possible to make the nitrogen gas escape from the adsorbent by varying the pressure while maintaining the temperature as described above (A–E in the figure). On the other hand, since the adsorbable quantity of the nitrogen gas by the adsorbent decreases when the temperature of the adsorbent is increased while maintaining the pressure, the escape of the nitrogen gas from the adsorbent is promoted as well (A–C in the figure). Therefore, more quantity of nitrogen gas can be exhausted from the adsorbent at once by heating the adsorbent with the coil 203 and, simultaneously, reducing the pressure in the mixed gas separator 200a (A–D in the figure).

Furthermore, the condensable gas recovering apparatus according to this first embodiment is provided with a pair of mixed gas separators 200a and 200b to improve the efficiency of the recovery work.

To be specific, assuming that the second step is carried out using the mixed gas separator 200a alone, the adsorbing power of the adsorption layer 202 in the mixed gas separator 200a is saturated in repetition of the second step, as described above. When the adsorbing power of the adsorption layer 202 is saturated, the mixed gas separator 200a proceeds to the third step as described above. During the third step, the mixed gas separator 200a cannot perform liquefaction and recovery of the $SF_6$ gas.

So, the mixed gas is introduced into the mixed gas separator 200b by controlling the switching valve 105 while the mixed gas separator 200a is in the third step, and the second process is executed in the mixed gas separator 200b in parallel with the third step, whereby the $SF_6$ gas is always liquefied and recovered in the condensable gas recovering apparatus 100 even when the mixed gas separator 200a cannot be used.

Consequently, it is desirable that the condensable gas recovering apparatus 100 is provided with at least two mixed gas separators in order to secure the continuity of the work.

As described above, according to the first embodiment of the invention, the gas recovering apparatus 100 is provided with a pair of mixed gas separators 200a and 200b, each including an adsorption layer 202 capable of supplying heat, and a gas cooler 204. Thereby, a mixed gas comprising nitrogen gas and $SF_6$ gas is completely separated into the respective gases, and the $SF_6$ gas is liquefied and recovered by making a low-temperature and high-pressure ambience in one of the mixed gas separators while the nitrogen gas is exhausted from the adsorption layer 200 and discharged to the air by making a high-temperature and low-pressure ambience in the other mixed gas separator. Therefore, when a gas insulator using a mixed gas as an insulating gas is inspected, the mixed gas can be processed safely while maintaining an extremely few discharge of $SF_6$ gas (within a legal limitation).

[Embodiment 2]

In the $SF_6$ gas liquefying and recovering method using the gas recovering apparatus 100 according to the first embodiment, the configuration of the mixed gas separator 200 included in the apparatus 100 may be changed to recover the $SF_6$ gas more efficiently. In this second embodiment, a mixed gas separator having a configuration different from that of the first embodiment will be described with reference to the figures.

The configuration of the mixed as separator 200 according to the first embodiment is as shown in FIGS. 3 and 4, and adsorption of nitrogen gas in the mixed gas separator 200 is performed by utilizing the natural circulation of the mixed gas generated between the adsorption layer 202 and the gas cooler 204 as described above.

That is, the natural circulation of the mixed gas between the adsorption layer 202 and the gas cooler 204 utilizes a difference between the specific weights of the components of the mixed gas. Generally, specific weights of gases are large at a high temperature and small at a low temperature. Referring to the structure of the mixed gas separator 200 shown in FIGS. 3 and 4, since the temperature of the nitrogen gas adsorbed by the adsorption layer 202 is relatively high, the temperature of the adsorption layer 202 increases as the adsorption layer 202 adsorbs the nitrogen gas, because of heat of adsorption. Then, the temperature of the atmosphere surrounding the adsorption layer 202 is high and, therefore, the high-temperature and high-pressure mixed gas further introduced into the mixed gas separator 200 hardly rises toward the adsorption layer 202, but stays in the lower part of the mixed gas separator 200.

That is, the nitrogen gas to be raised has a relatively low temperature while the $SF_6$ gas to be dropped has a relatively high temperature, whereby the difference between the specific weights of these gases is reduced and the motive power for generating the natural circulation of the mixed gas is reduced, leading to a reduction in the $SF_6$ gas recovery efficiency.

To avoid this phenomenon, the thermal environment within the mixed gas separator 200 should be made as uniform as possible.

Figure 9:
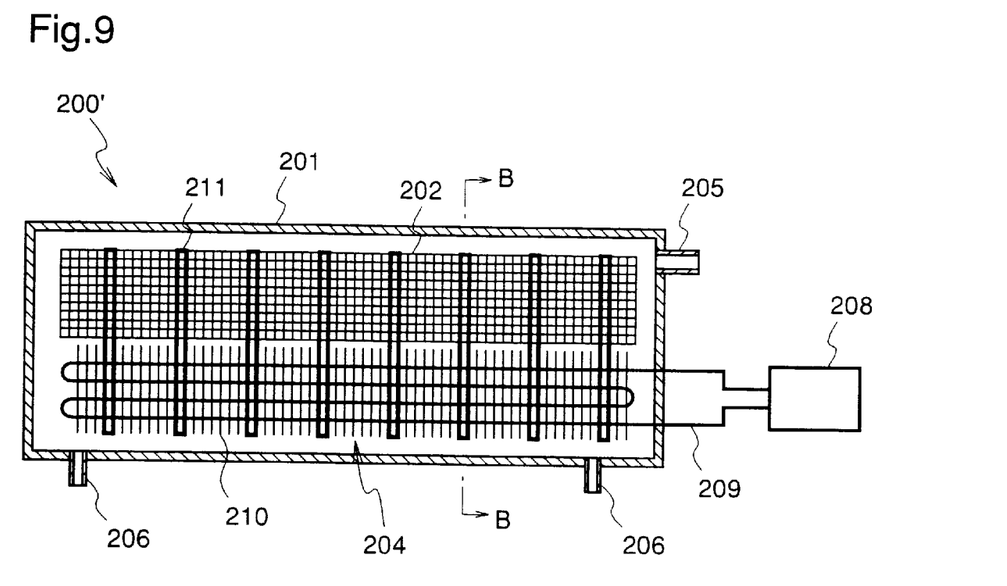
FIG. 9 is a cross-sectional view of a mixed gas separator in the major-axis direction, according to a second embodiment of the invention.
Figure 10:
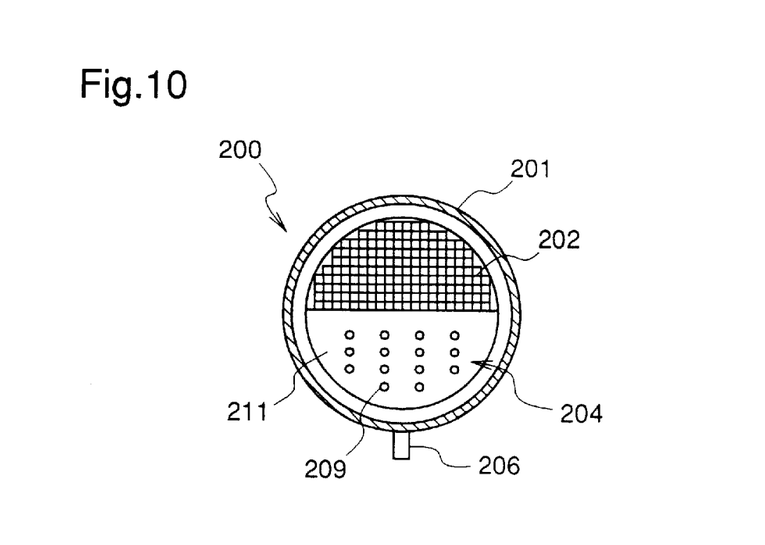
FIG. 10 is a cross-sectional view taken along a line B—B in FIG. 9.

FIG. 9 is a cross-sectional view of a mixed gas separator 200' in its major-axis direction, aiming to solve the above-described problem. FIG. 10 is a cross-sectional view taken along a line B—B in FIG. 10.

The feature of this mixed gas separator 200' resides in that heat-transfer plates 211 are arranged from the lower end of the gas cooler 204 to the upper end of the adsorption layer 202, at equal intervals in the major-axis direction of the mixed gas separator 200'. Although there are many possible shapes of the heat-transfer plates 211, it is desirable that the heat-transfer plates 211 intrude into the adsorption layer 202 in order to make the thermal environment in the mixed gas separator 200' as uniform as possible. To be emphasized is as follows. Since the gas cooler 204 and the adsorption layer 202 are thermally connected at equal intervals, the temperature in the mixed gas separator 200' is made uniform in the vertical direction viewed in the transverse cross section of the mixed gas separator 200', thereby avoiding a reduction in the motive power for generating natural circulation of the mixed gas which occurs due to a difference of the specific weights.

Other components of the mixed gas separator 200' are identical to those described for the first embodiment. That is, the mixed gas separator 200' comprises a pressure tank 201, an adsorption layer 202, a gas cooler 204, pipes 205 and 206, and a vacuum exhauster 207. Although a coil 203 is omitted in the mixed gas separator 200', the separator 200' may have a coil 203 for the same reason as described for the first embodiment. Further, the structure of the mixed gas separator 200' is fundamentally identical to that described for the first embodiment except that the heat plates 211 are added.

Since the mixed gas separator 200' is constructed as described above, natural circulation of the mixed gas is generated more efficiently, whereby recovery of the $SF_6$ gas is performed more efficiently.

[Embodiment 3]

Figure 11:
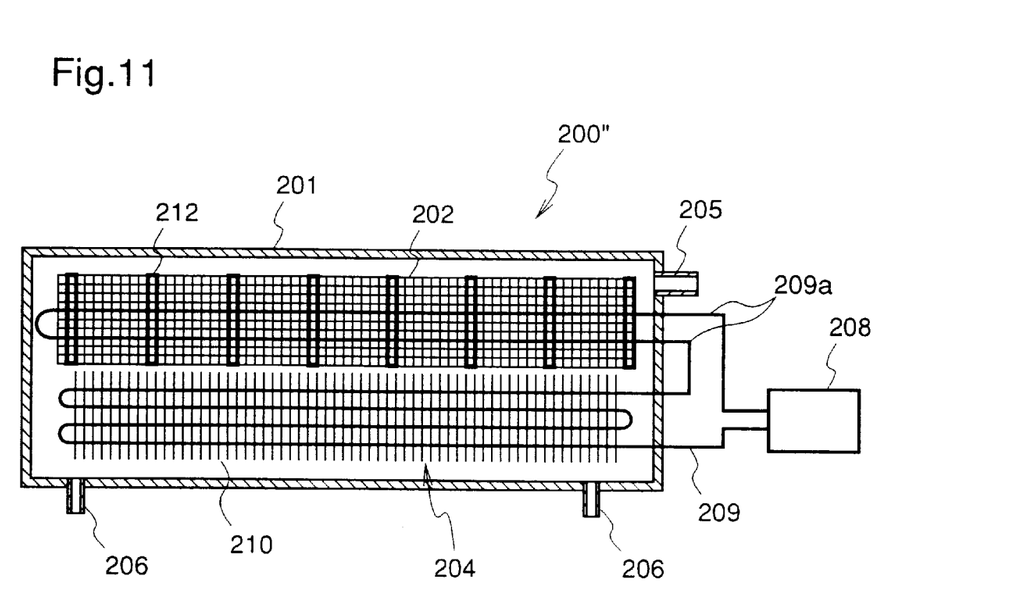
FIG. 11 is a cross-sectional view of a mixed gas separator in the major-axis direction, according to a third embodiment of the invention.

In the second embodiment of the invention, the temperature in the mixed gas separator 200' is made uniform in the vertical direction viewed in the transverse cross section of the separator 200' by thermally connecting the gas cooler 204 and the adsorption layer 202 at equal intervals in the major-axis direction of the separator 200', thereby avoiding that the motive power for generating natural circulation of the mixed gas is reduced. In a mixed gas separator 200" according to this third embodiment of the invention, as shown in FIG. 11, heat-transfer plates 212 are disposed in an adsorption layer 202 at equal intervals in the major-axis direction of the mixed gas separator 200", and a second heat-transfer pipe 209a is arranged through the adsorption layer 202 so that it is thermally connected with the heat-transfer plates 212. The second heat-transfer pipe 209a and the heat-transfer pipe 209 of the gas cooler 204 are connected, in serial or parallel, to the refrigerator 208.

Therefore, as compared with the second embodiment, the temperature in the mixed gas separator 200" in the vertical direction viewed in the transverse cross section of the separator 200" is made uniform with reliability, thereby preventing the motive power for generating gas circulation from being reduced due to a reduction in difference of the specific weights.

The fundamental components of the mixed gas separator 200" according to this third embodiment, i.e., the pressure tank 201, the adsorption layer 202, the gas cooler 204, the pipes 205 and 206, and the vacuum exhauster 207, are identical to those described for the first embodiment. Further, the mixed gas separator 200" may have a coil 203 for the same reason as described above.

Figure 12:
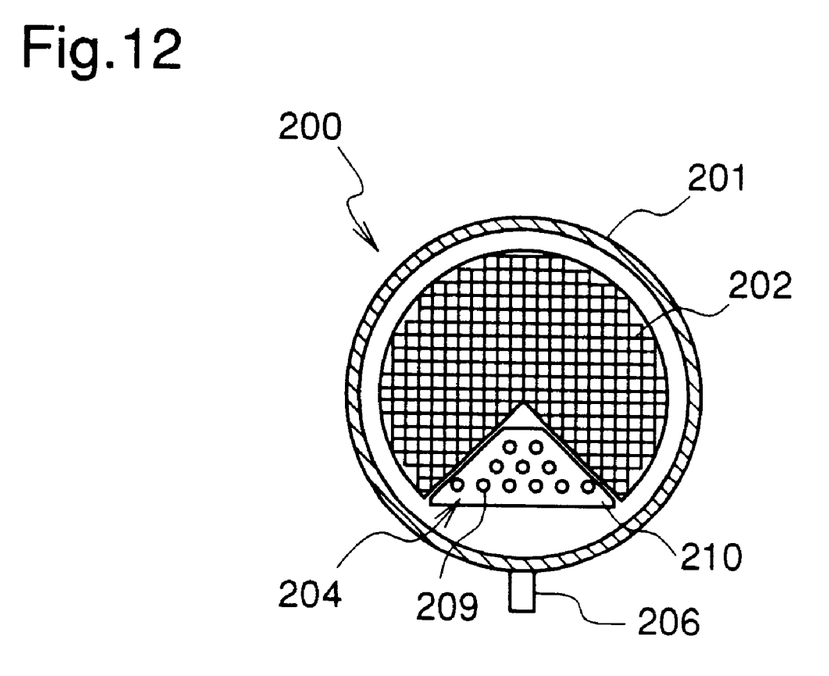
FIG. 12 is a cross-sectional view of another example of a mixed gas separator in the minor-axis direction.

FIG. 12 shows another example of a mixed gas separator 200, wherein a trapezoidal cooler 204 is disposed beneath the adsorption layer 202, in the axial direction of the cylindrical mixed gas separator. The shape of the cooler 204 may be rectangle or sphenoid. Further, although the pressure tank 201 of the mixed gas separator 200 is cylindrical in shape and the opposed ends thereof are closed, the shape of the pressure tank 201 is not restricted thereto. However, it is desirable that the presure tank 201 is cylindrical because the pressure inside the tank 201 is high in the condensable gas recovering method of the present invention.

What is claimed is:

1. A method for recovering a condensable gas from a mixed gas by using a condensable gas recovering apparatus comprising:

a compressor for compressing a mixed gas comprising a condensable gas and an incondensable gas;

a mixed gas separator including an adsorbent that adsorbs the incondensable gas, and a cooler; and a vacuum exhauster;

said method comprising:

a first step of introducing the mixed gas highly compressed by said compressor into said mixed gas separator;

a second step of liquefying and recovering the condensable gas by cooling said mixed gas separator with said cooler while said adsorbent adsorbs the incondensable gas contained in the mixed gas in a high pressure state; and a third step of exhausting the incondensable gas from said adsorbent in a low pressure state where the gas in the mixed gas separator has been exhausted by said vacuum exhauster.

2. A method for recovering a condensable gas from a mixed gas by using a condensable gas recovering apparatus comprising:

a compressor for compressing a mixed gas comprising a condensable gas and a n incondensable gas;

a mixed gas separator including an adsorbent that adsorbs the incondensable gas, a cooler, and a heater; and a vacuum exhauster;

said method comprising:

a first step of introducing the mixed gas highly compressed by said compressor into said mixed gas separator;

a second step of liquefying and recovering the condensable gas by cooling said mixed gas separator with said cooler while said adsorbent adsorbs the incondensable gas contained in the mixed gas in a high pressure state; and a third step of exhausting the incondensable gas from said adsorbent by heating said adsorbent with said heater in a low pressure state where the gas in the mixed gas separator has been exhausted by said vacuum exhauster.

3. The condensable gas recovering method of claim 1 wherein:

said condensable gas recovering apparatus has a couple of said mixed gas separators; and one of the mixed gas separators performs the second step while the other mixed gas separator performs the third step.

4. The condensable gas recovering method of claim 1 using said condensable gas recovering apparatus wherein said cooler is embedded in said adsorbent.

5. The condensable gas recovering method of claim 1 using said condensable gas recovering apparatus wherein:

said adsorbent is disposed in an upper part of said mixed gas separator; and said cooler is disposed inside said adsorbent as well as under said adsorbent in said mixed gas separator.

6. The condensable gas recovering method of claim 1 using said condensable gas recovering apparatus wherein:

said adsorbent is disposed in an upper part of said mixed gas separator; and said cooler is disposed under said adsorbent in said mixed gas separator.

7. The condensable gas recovering method of claim 1 using said condensable gas recovering apparatus wherein said mixed gas separator is cylindrical in shape, opposed ends of which are closed, and is disposed with the major axis being approximately horizontal.

8. The condensable gas recovering method of claim 1 using said condensable gas recovering apparatus wherein:

said mixed gas separator is cylindrical in shape, opposed ends of which are closed, and is disposed with the major axis being approximately horizontal; and at least one heat-transfer medium connecting said adsorbent with said cooler is disposed in the axial direction of said mixed gas separator.

9. The condensable gas recovering method of claim 1 wherein said condensable gas is a gas selected from the group consisting of sulfur hexafluoride ($SF_6$) gas, freon gas, and hydrocarbon gas.

10. The condensable gas recovering method of claim 1 wherein said incondensable gas is a gas selected from the group consisting of nitrogen gas and air.

11. The condensable gas recovering method of claim 1 wherein said adsorbent is aluminosilicate containing calcium.

12. The condensable gas recovering method of claim 1 wherein said condensable gas is a condensable gas for an electrical equipment.

13. A condensable gas recovering apparatus comprising:

a compressor for compressing a mixed gas comprising a condensable gas and an incondensable gas;

a mixed gas separator including an adsorbent that adsorbs the incondensable gas, and a cooler; and a vacuum exhauster.

* * * * *